United States Patent
Olander

(10) Patent No.: US 7,946,095 B2
(45) Date of Patent: May 24, 2011

(54) MESHWRAP DISPENSING MECHANISM FOR ROUND BALERS

(75) Inventor: Brian D. Olander, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 154 days.

(21) Appl. No.: 12/365,077

(22) Filed: Feb. 3, 2009

(65) Prior Publication Data

US 2010/0192516 A1     Aug. 5, 2010

(51) Int. Cl.
*B65B 11/04* (2006.01)
*B65B 63/04* (2006.01)
*A01F 15/07* (2006.01)

(52) U.S. Cl. .......... 53/118; 53/587; 53/389.3; 53/389.4

(58) Field of Classification Search ............. 53/116, 53/118, 529, 587, 211, 389.1–389.5; B65B 11/04, B65B 11/30, 41/16, 63/02, 63/04; A01F 15/07
See application file for complete search history.

(56) References Cited

U.S. PATENT DOCUMENTS

| | | | |
|---|---|---|---|
| 5,974,764 A | | 11/1999 | Anstey et al. |
| 5,979,141 A | * | 11/1999 | Phillips ................... 53/389.2 |
| 6,050,052 A | | 4/2000 | Herron et al. |
| 6,453,805 B1 | * | 9/2002 | Viaud et al. ................... 53/389.3 |
| 6,622,463 B1 | * | 9/2003 | Anstey et al. ................... 53/587 |
| 6,796,109 B2 | * | 9/2004 | Viaud ................... 53/587 |
| 7,478,517 B2 | * | 1/2009 | Paillet et al. ................... 53/587 |
| 2005/0091959 A1 | * | 5/2005 | Viaud et al. ................... 56/341 |
| 2006/0218878 A1 | * | 10/2006 | Chapon et al. ................... 53/389.2 |
| 2008/0282662 A1 | * | 11/2008 | Viaud et al. ................... 56/341 |

FOREIGN PATENT DOCUMENTS

EP     941651     9/1991

* cited by examiner

*Primary Examiner* — Stephen F Gerrity

(57) ABSTRACT

A wrapper dispensing mechanism for round balers includes a feed roller shiftable generally toward and away from a baling element of a bale forming mechanism so as to be selectively brought into and out of engagement with the baling element. The feed roller is driven by the baling element when the feed roller is in engagement with the baling element, with the feed roller and the baling element cooperatively defining a temporary nip therebetween during engagement. The feed roller is disposed to at least partially vertically support the roll of supply material thereon. A method of dispensing wrapping material from a supply roll includes supporting the supply roll at least partially on a feed roller, shifting the feed roller into engagement with the baling element to create a temporary nip therebetween and drive the feed roller, and driving the baling element while the feed roller is in engagement therewith.

17 Claims, 11 Drawing Sheets

MESHWRAP DISPENSING MECHANISM FOR ROUND BALERS

TECHNICAL FIELD

The present invention relates generally to a wrapper dispensing mechanism for paying out wrapping material into a baling chamber of a round baler to wrap a formed bale during a bale wrapping cycle. More specifically, the present invention concerns a wrapper dispensing mechanism with a supply roll of wrapping material that is at least partially supported on a feed roller that is shiftable into and out of engagement with a portion of a baling element, where engagement with the baling element drives the feed roller.

BACKGROUND

Farmers typically use a machine, such as a round baler, to collect crop materials from a windrow and form the crop materials into a bale for easier transport or storage. In such a machine, it is generally known in the art to wrap a formed bale (with material such as meshwrap, twine, or the like) in order to keep the formed bale intact. Commonly, such wrapping material is supplied from a mechanism associated with the baler, and is moved into the baling chamber from a source during a wrapping cycle.

Conventionally, the materials used for wrapping a bale are lightweight and flimsy, making them highly susceptible to being affected by factors such as wind, static electricity, and the like, as the material is fed into the baling chamber. Although such factors may be relatively inconsequential to other baling operations, they can present the potential of causing the wrapping material to be misdirected or caught upon some part of the baler disposed along the path of travel of the material into the chamber. For example, even slight winds can blow meshwrap material off course such that continued feeding of the material will cause the meshwrap to accumulate in undesirable areas.

Traditionally, obstacles to smooth and effective feeding of wrapping material from a source into the chamber are present in both the area of travel between the source and the feeding mechanism, and between the feeding mechanism and the inlet into the baling chamber, at which point the material is typically grasped by the bale, reducing the likelihood of any further wayward movement problems. For example wrapper dispensing mechanisms are often spaced some distance from the baling chamber, such as along a rear wall of the baler, requiring an apparatus for initially feeding the wrapping material to point at which it is grasped by the bale or bale forming mechanism. Similarly, the source of wrapping material is often stored some distance away from the feeding apparatus, such that a supply roll can be more easily loaded or unloaded into the baler, presenting additional areas where the wrapping material can be undesirably disturbed from its intended course.

The areas within the baler where wrapping material can become disassociated with its intended path of travel, or moved off course by external forces, have historically presented numerous problems in getting the wrapping material smoothly fed into the baling chamber. The prior art does not include a wrapper dispensing mechanism where the source roll is stored in a supporting relationship in contact with a feed roller that is itself shiftable into and out of engagement with the baling elements of the apparatus, virtually eliminating areas where the wrapping material can become disassociated with its intended path of travel.

SUMMARY

The present invention provides a wrapper dispensing mechanism for round balers that includes a feed roller shiftable generally toward and away from a baling element of a bale forming mechanism so as to be selectively brought into and out of engagement with the baling element. The feed roller is driven by the baling element when the feed roller is in engagement with the baling element, with the feed roller and the baling element cooperatively defining a temporary nip therebetween during engagement. The feed roller is configured to at least partially vertically support the roll of supply material thereon.

As the feed roller is brought into engagement with the baling element, and thus begins to rotate, the supporting relationship between the feed roller and the supply roll is maintained, which helps turn the supply roll. Such cooperative rotation between the feed roller and the supply roll reduces tension in the wrapping material, particularly during the initial stages of a wrapping cycle. The path of an initial length of wrapping material is consequently positively controlled by contact with the feed roller during shifting of the feed roller between a first position, spaced away from the baling elements, and a second position, disposed in engagement with the baling element.

Positive control of the initial length of wrapping material helps to drastically reduce areas where the wrapping material could possibly become disassociated with its intended path of travel from the supply roll into the baling chamber. This reduces the potential for problems associated with wrapping material not feeding properly.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWINGS

A preferred embodiment of the present invention is described in detail below with reference to the attached drawing figures, wherein.

Figure 1:
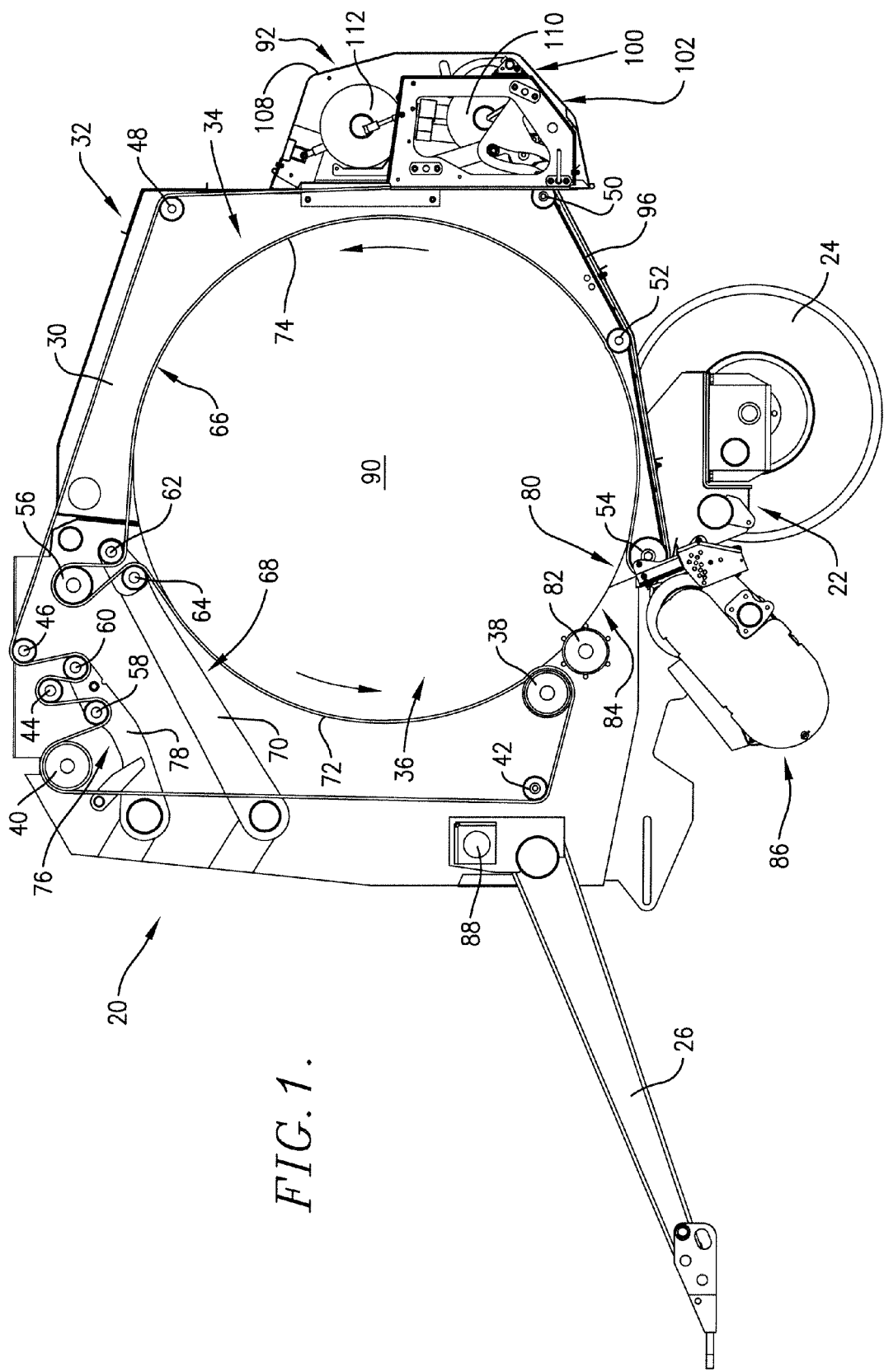
FIG. 1 is a left side elevational view of a round baler having a wrapper dispensing mechanism constructed in accordance with the principles of the present invention, with various baler components removed to reveal internal details of construction of the baler.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 5:
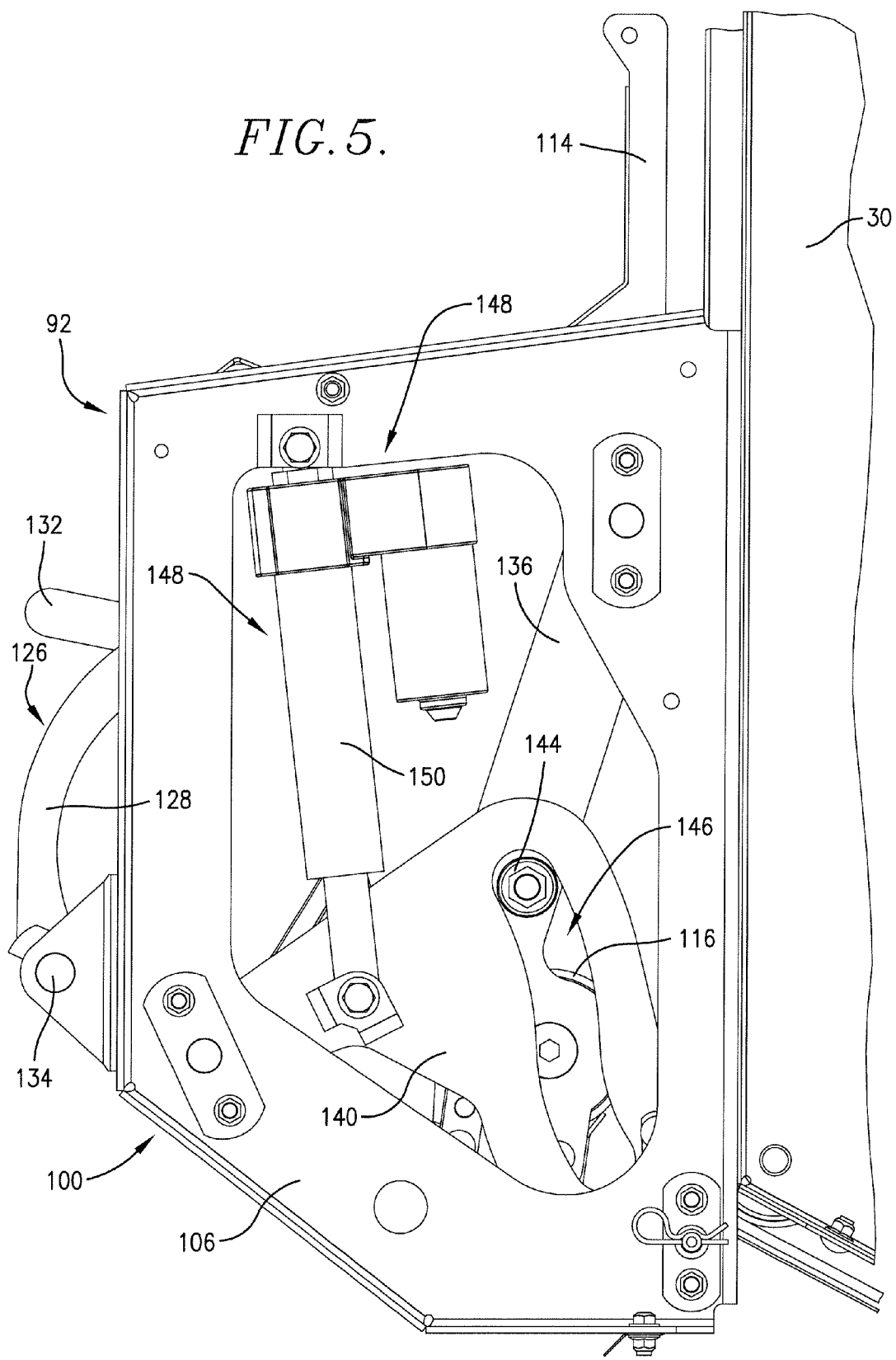
FIG. 5 is an enlarged, fragmentary, right side elevational view of the wrapper dispensing mechanism, with the cover of the wrapping mechanism being removed to illustrate, among other things, movable structure of the mechanism.
Figure 6:
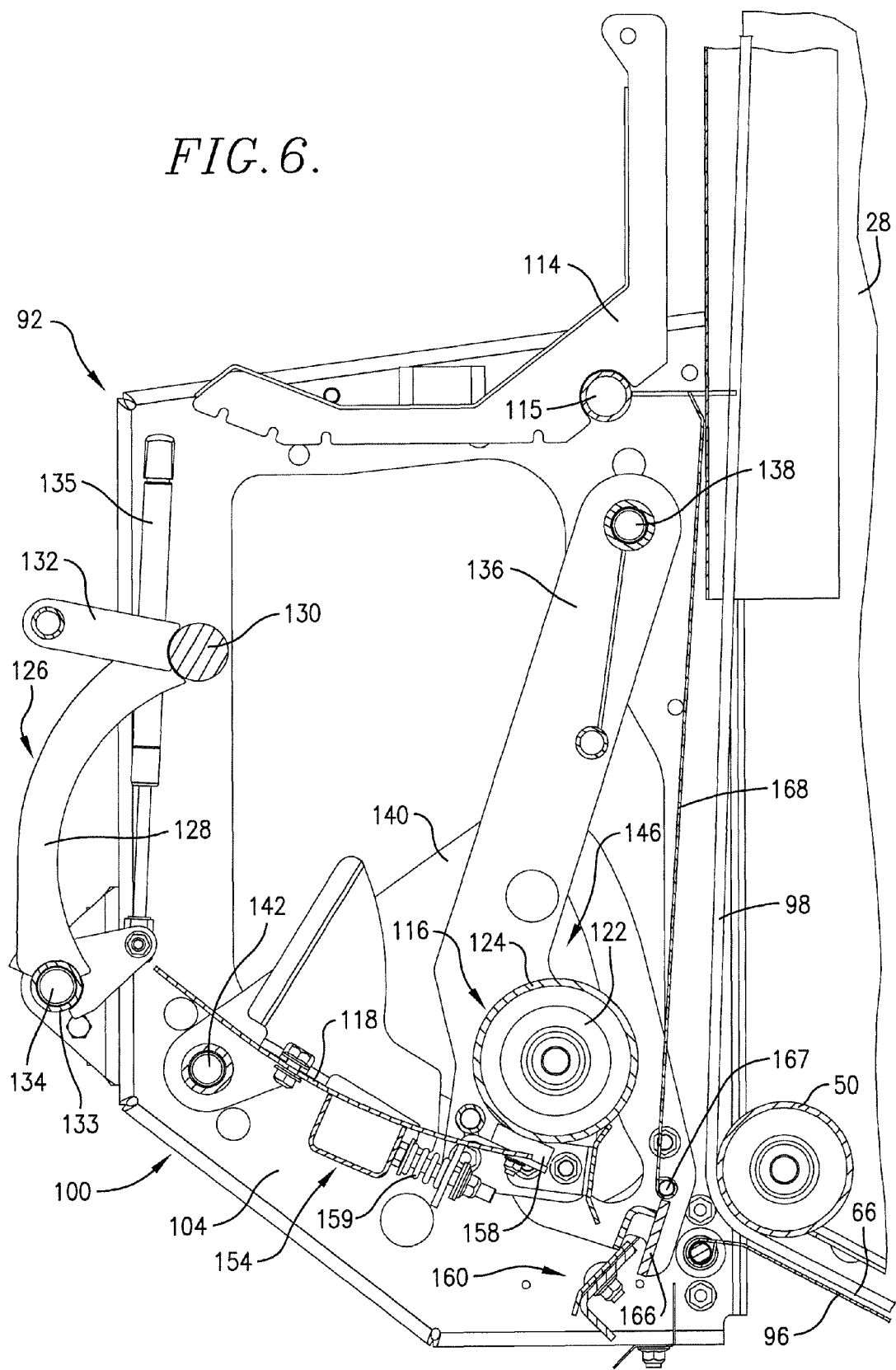
FIG. 6 is an enlarged, fragmentary, right side elevational view of the wrapper dispensing mechanism, similar in many respects to FIG. 5, but with the cover and right sidewall of the wrapping mechanism being removed to illustrate, among other things, the configuration of the mechanism when in a first position.

With initial reference to FIG. 1, a round baler 20 selected for purposes of illustration generally includes a chassis or frame 22 that is supported for travel by a pair of ground engaging wheels 24 (only one wheel being shown in the drawing figures). A tongue 26 projects forwardly from chassis 22 for connection with a towing vehicle (not shown). It is noted that all reference to front/rear or left/right orientation of baler 20 and components thereof is made from the reference point of standing behind baler 20 and looking forward in the direction of travel. Chassis 22 carries a pair of upright, laterally spaced sidewalls 28, 30 (see FIGS. 5 and 6) that cooperate to define a space within which bale forming and bale wrapping operations may be carried out as baler 20 is advanced across a field.

Sidewalls 28, 30 present stationary forward portions fixed to chassis 22 and rearward portions swingably attached to forward portions at an elevated pivot (not shown). Rearward portions of sidewalls 28, 30 cooperatively define a tailgate 32 that is swingable between an open discharge position (not shown), in which tailgate 32 is sufficiently raised to allow a completely formed to bale to be discharged from baler 20, and a closed baling position (as illustrated), in which the bale forming and wrapping operations are performed.

In the illustrated embodiment, baler 20 includes a bale forming mechanism 34 that comprises a number of rolls and belts that cooperate with sidewalls 28, 32 to define an internal baling chamber 36 that assumes different shapes and sizes throughout the bale forming cycle. In this respect, illustrated round baler 20 is a so-called "variable chamber" belt-type machine, wherein baling chamber 36 is initially relatively small, and then grows progressively larger as the bale increases in diameter within baler 20. It will be appreciated, however, that the principles of the present invention are also applicable to a "fixed chamber" machine (not shown) in which the dimensions of a baling chamber are at least substantially constant throughout the baling cycle, with the diameter of such a chamber corresponding substantially with the diameter of a full-size bale.

With the foregoing general explanation in mind, bale forming mechanism 34 of illustrated baler 20 comprises a plurality of laterally extending, stationary rolls, including a lower drive roll 38, an upper drive roll 40, and a plurality of idler rolls 42, 44, 46, 48, 50, 52, 54, 56, 58, 60, 62, and 64. It is noted that a subset of the idler rolls 42-56 are stationary with respect to their position relative to baler frame 22, while another subset of the idler rolls 58-64 are mounted to swingable structure that is discussed in more detail below. It is also noted that additional rolls, such as a trash clearing roll (not shown) or an offsetting roll (not shown) could be incorporated into bale forming mechanism 34 without departing from the teachings of the present invention.

Stationary rolls 42-56 are arranged between sidewalls 28, 30 in a generally circular pattern (when viewed from the left side shown in FIG. 1) for guiding a plurality of laterally spaced endless belts 66 as belts 66 are driven linearly during bale formation and wrapping. While bale forming mechanism 34 of the depicted embodiment is made up of a plurality of belts 66, alternative baling elements, such as a single belt or a plurality of rollers (not shown) could alternatively be used in a baler, as will be understood by one of ordinary skill in the art, without departing from the teachings of the present invention.

Bale forming mechanism 34 further includes a belt guiding or retaining assembly 68 having a pair of vertically swingable arms 70 (with only the right arm being shown in FIG. 1) located inside baler 20 adjacent sidewalls 28, 30. Arms 70 support a pair of idler rolls 62, 64 in a position to directly overlie the bale during its formation within baling chamber 36. In addition, arms 70 are yieldably biased downwardly so that rolls 62, 64 exert pressure against the top of the bale as it is being formed. It will be noted that belts 66 wrap under lower drive roll 38, over relatively large idler roll 56, and under idler roll 54 to present a pair of opposed, front and rear belt stretches 72, 74 that cooperate with sidewalls 28, 30 to define baling chamber 36.

In addition, belts 66 are confined between retaining idler rolls 62, 64, and extend upwardly therefrom to wrap around relatively large idler roll 56, whereby vertical belt stretches 72, 74 converge toward one another as idler rolls 62, 64 are approached. Although not illustrated in detail, it will be appreciated by one of ordinary skill in the art that baling chamber 36 consequently initially assumes a generally vertical, triangular configuration when baling chamber 36 is empty and arms 70 are in their lowermost position. When drive rolls 38 and 40 are rotated in a clockwise direction (as oriented in the illustration of FIG. 1), front belt stretch 72 moves in a downward direction, while rear belt stretch 74 moves in an upward direction, when baling chamber 36 is empty at the beginning of a new bale forming cycle.

A slack control arm assembly 76 located in the upper front portion of baler 20 includes a pair of vertically swingable arms 78 (with only the right arm being shown in FIG. 1). Arms 78 support the other pair of movable idler rolls 58, 60. As will be readily appreciated by one of ordinary skill in the art upon review of this disclosure, slack control assembly 76 controls the amount of slack paid out to belts 66 as the bale grows within baling chamber 36.

Baling chamber 36 is open at the bottom to present a baling chamber inlet 80 defined generally between a starter roll 82 and idler roll 54. Baling chamber 36 is obviously located well above and off of the ground. Therefore, some pickup mechanism must be provided for picking up crop material as baler 20 moves across the field and for delivering the crop material into baling chamber 36. In the illustrated embodiment, baler 20 is constructed in accordance with the principles of open throat, vertical chamber baling, such that incoming crop material is not subjected to any significant compression until it passes through inlet 80 and is fully received within baling chamber 36. Thus, the part of the crop flow path upstream from baling chamber 36 is open and non-compressive, and may be described as an open throat 84 through which the picked up crop material passes on its way to baling chamber 36.

Although not illustrated in detail, it will be readily appreciated by one of ordinary skill in the art that baler 20 preferably includes a pickup header 86 having a standard resilient rotary rake tine assembly for picking crop material up off of the ground. If desired, the rake tine assembly selected for use may be wider than baling chamber 36 in a direction transverse to the path of travel of baler 20, in which case baler 20 is preferably provided with the center-gathering stub augers, as will be understood by one of ordinary skill in the art upon review of this disclosure. In addition, pickup header 86 may include a rigid tooth feeder positioned between the rake tine assembly and chamber inlet 80 for delivering crop material from the rake tine assembly into baling chamber 36 during successive stuffing strokes.

Power for operating various components of baler 20 can be delivered by a drive line (not shown) associated with tongue 26. A front end of such a drive line can be adapted for connection to a power takeoff shaft (not shown) of the towing vehicle, while a rear end of the drive line can be coupled with a gearbox 88 mounted to chassis 22. Gearbox 88 is coupled with the various drives for the baler components in a conventional manner, as will be readily appreciated by one of ordinary skill in the art. Additional details of an exemplary round baler, such as baler 20, are disclosed in U.S. Pat. No. 6,050,052 ("the '052 patent"). The '052 patent, which has the same assignee of record as the present application, is hereby incorporated by reference in its entirety into the present specification to the extent not inconsistent with the present disclosure.

Once the bale of crop material reaches its full size, as illustrated in FIG. 1 and referenced by the numeral 90, it is desirable that bale 90 be tightly wrapped before being discharged from baling chamber 36. Thus, baler 20 further broadly includes a wrapping apparatus 92 for wrapping formed bale 90 with a wrapping material 94 once the bale forming cycle has been completed. While formed bale 90 is illustrated as being fully formed, it is also possible to wrap a partially formed bale (not shown) with wrapping apparatus 92 without departing from the teachings of the present invention.

Wrapping apparatus 92 is disposed at the rear of baler 20 and, consequently, wrapping material 94 that is dispensed by wrapping apparatus 92 must travel forwardly to a baling chamber access opening (chamber inlet 80 in the illustrated embodiment, although an alternative opening could be used without departing from the teachings of the present invention) before it can wrap around formed bale 90. A pan 96 extends generally between a rearward most belt stretch 98 and idler roll 54. Pan 96 is spaced slightly below belts 66 as they travel from idler roll 50, past idler roll 52, and to idler roll 54, such that forwardly moving belts 66 convey wrapping material 94 along pan 96.

Bale wrapping apparatus 92 generally includes a housing 100 that contains wrapping material 94 and a wrapper dispensing mechanism 102 for paying out lengths of wrapping material 94 during the bale wrapping cycle. The lateral boundaries of housing 100 are defined by a pair of sidewalls 104, 106 that are attached to the rear of tailgate 32. The rear boundary of housing 100 is defined by a rear wall 108 that can be opened to provide access to the interior of housing 100.

Figure 2:
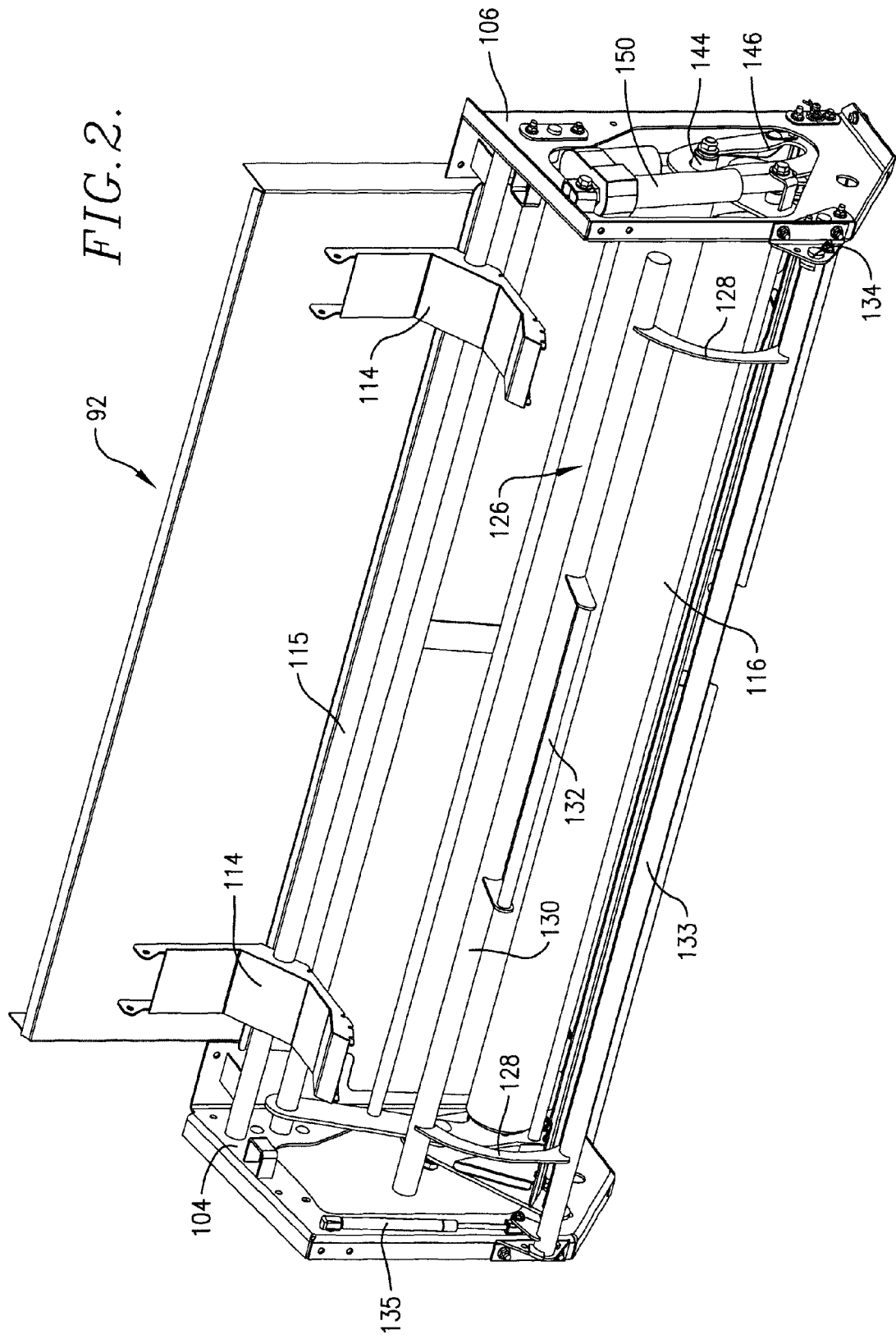
FIG. 2 is an enlarged, isometric view of a portion of the wrapper dispensing mechanism shown in FIG. 1.
Figure 3:
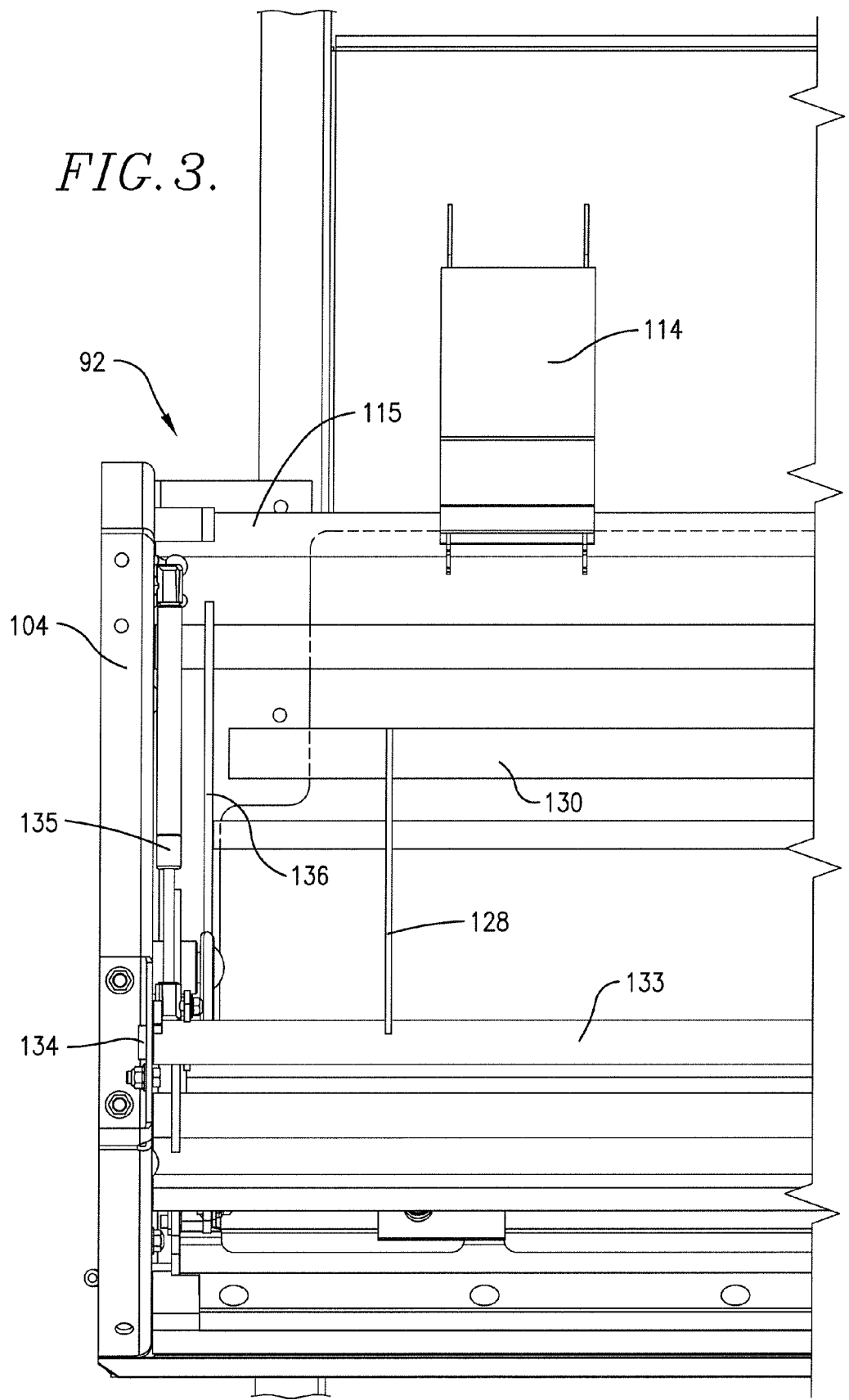
FIG. 3 is an enlarged, fragmentary, rear elevational view of a left side portion of the wrapper dispensing mechanism.
Figure 4:
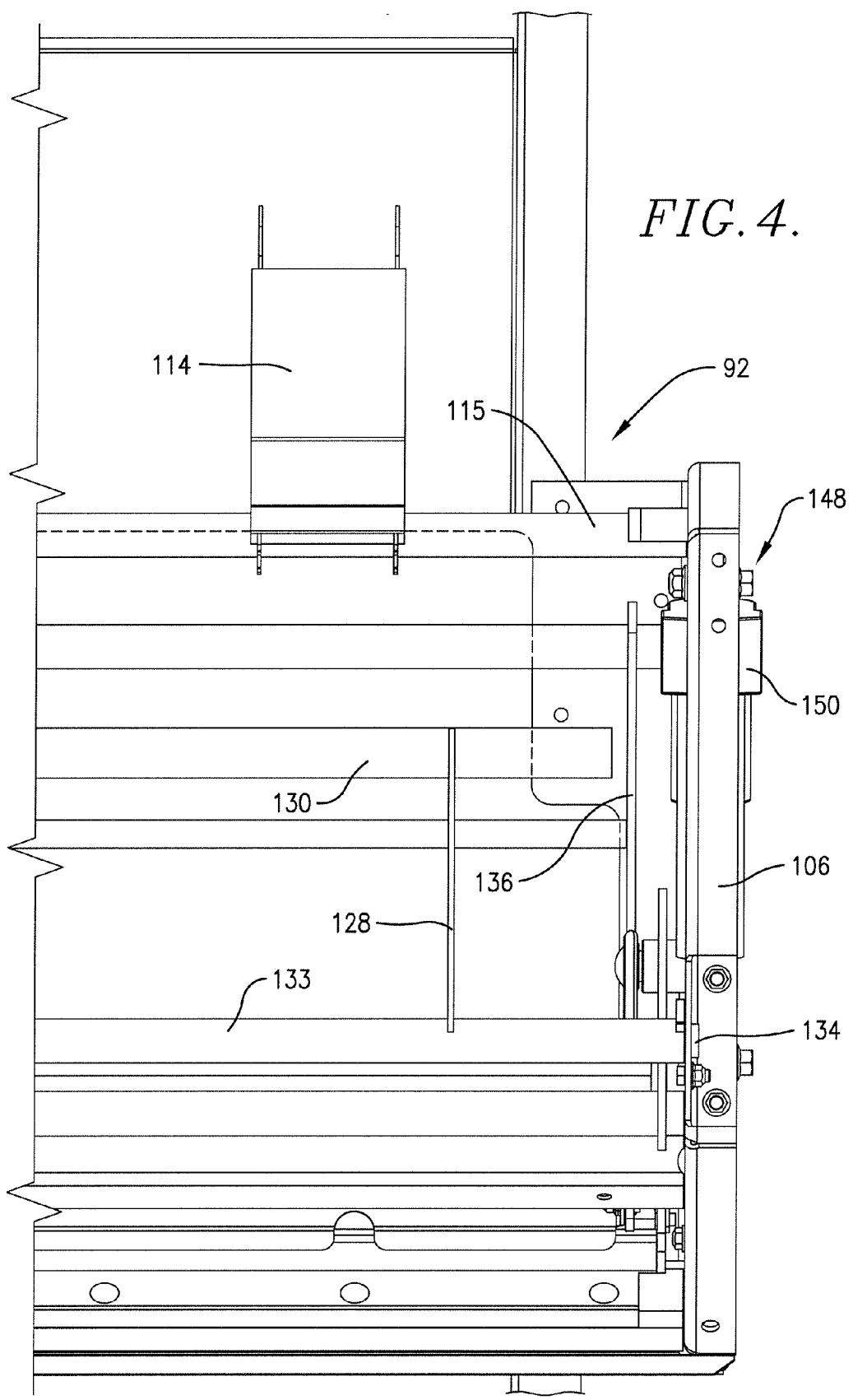
FIG. 4 is an enlarged, fragmentary, rear elevational view of a right side portion of the wrapper dispensing mechanism, similar in many respects to FIG. 3, but illustrating the other side portion of the mechanism.

Within housing 100, a roll of supply material 110 is supported and provides a source of wrapping material 94 for the bale wrapping cycle, as is described in more detail below. As shown in FIG. 1, a spare roll of supply material 112 can also be stored within housing 100. Spare roll 112 is supported on a two-part cradle 114 that is carried by a transverse member 115 (FIG. 2) operably fixed at its opposite ends to sidewalls 104, 106.

Roll of supply material 110 is cooperatively supported by a feed roller 116 and a platform 118. As shown particularly in FIG. 8, feed roller 116 and platform 118 each at least partially vertically support roll of supply material 110, with feed roller 116 and roll of supply material 110 defining a nip 117 therebetween. Platform 118 is operably secured to structure of housing 100 to be fixed relative thereto. In the illustrated embodiment, platform 118 presents an arcuate shape, such that roll of supply material 110 is supported on a concave surface 120.

Feed roller 116 comprises an inner core 122 and an outer layer 124. In one embodiment, inner core 122 is formed of a non-compressible material, such as steel, while outer layer 124 is formed of a compressible material, such as rubber, configured for frictional engagement with roll of supply material 110. In the illustrated embodiment, it is noted that feed roller 116 consists of a single cylindrical member and is the only feed roller of wrapper dispensing mechanism 102, although additional feed rollers (not shown) could be used in an alternative embodiment without departing from some aspects of the present invention.

Figure 8:
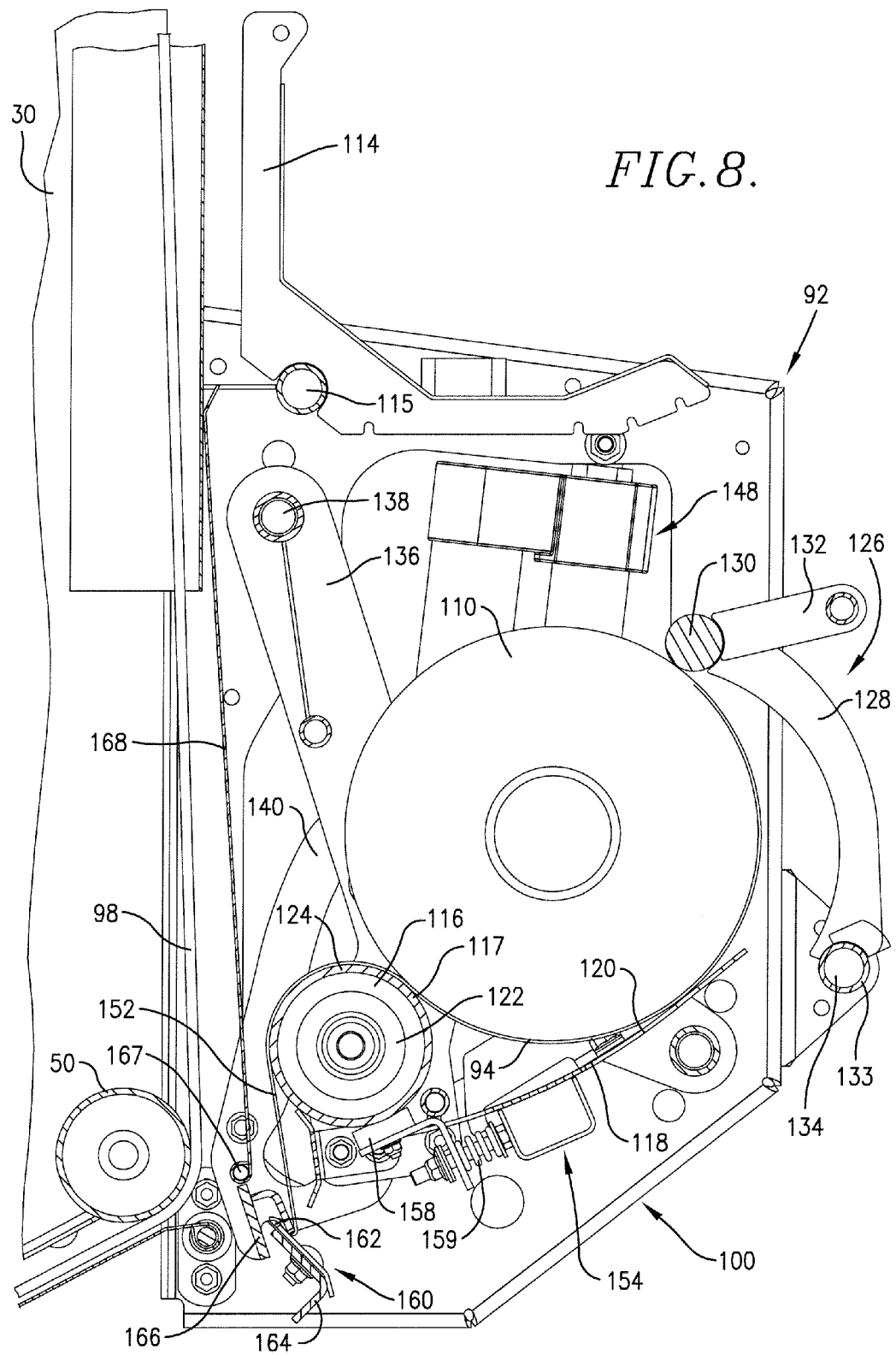
FIG. 8 is an enlarged, fragmentary, left side elevational view of the wrapper dispensing mechanism, similar in many respects to FIG. 7, but with additional components removed to illustrate, among other things, the configuration of the mechanism with a supply roll supported at least partially on a feed roller.
Figure 11:
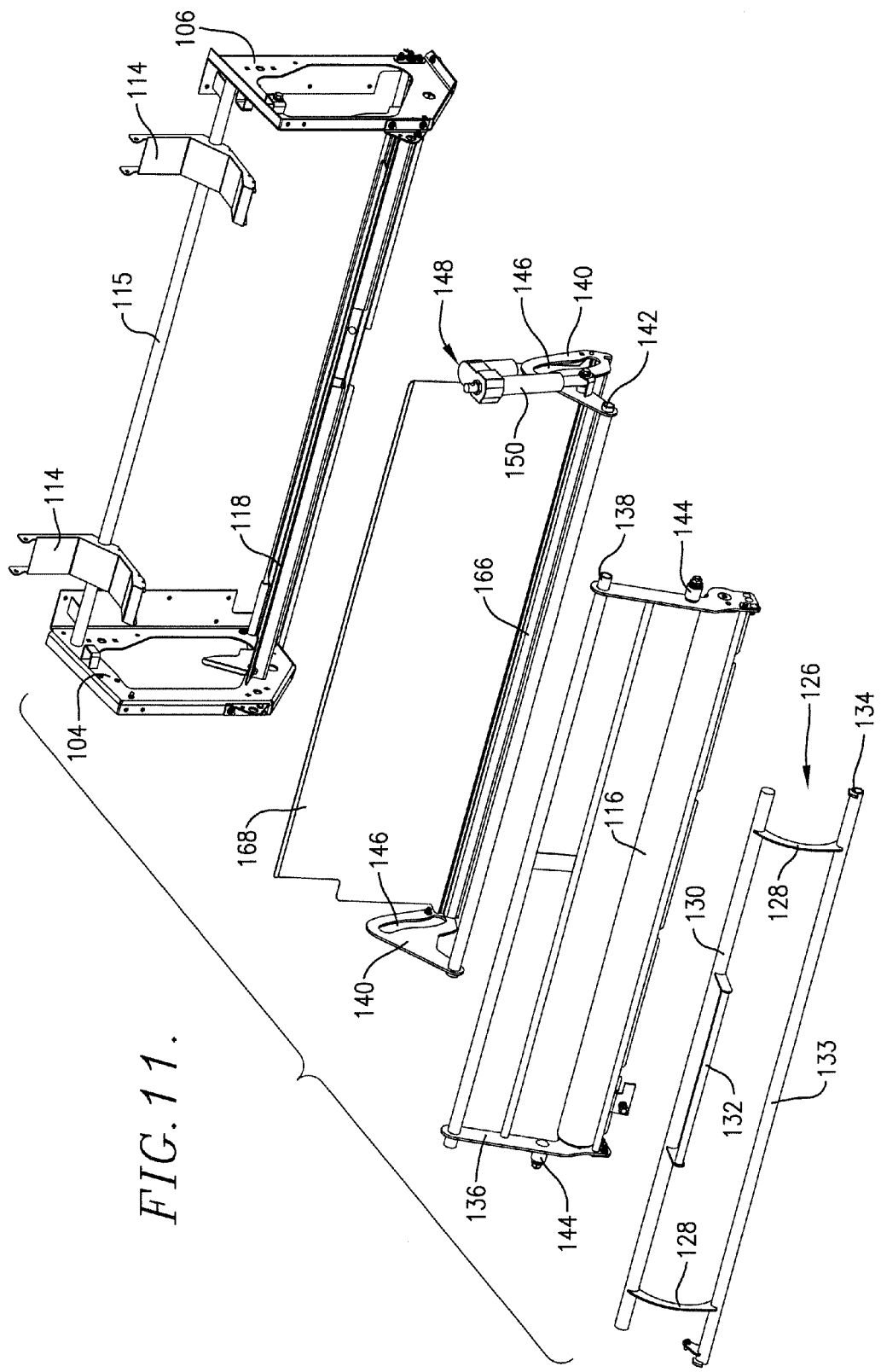
FIG. 11 is an enlarged, exploded, isometric view of the portion of the wrapper dispensing mechanism shown in FIG. 2, but illustrating individual components comprising the mechanism.

With continued reference to FIG. 8 and also to FIG. 11, a hold down assembly 126 is operably attached to housing 100 and is configured to press against roll of supply material 110 to bias roll of supply material 110 forwardly and downwardly where it is cooperatively supported by feed roller 116 and platform 118. Hold down assembly 126 broadly includes a pair of spaced arms 128, a contact rod 130 spanning one end of arms 128 and operably fixed thereto, a handle 132 fixed to rod 130, and a tube 133 fixed to and spanning the opposite ends of arms 128. Hold down assembly 126 is made pivotable about an axis extending through tube 133 by a pair of stub pivots 134 projecting into opposite ends of tube 133. The bias exerted by hold down assembly 126 can be due to the weight of assembly 126 or an additional external force, such as that provided by a biasing cylinder 135 shown in FIGS. 2 and 6.

Figure 7:
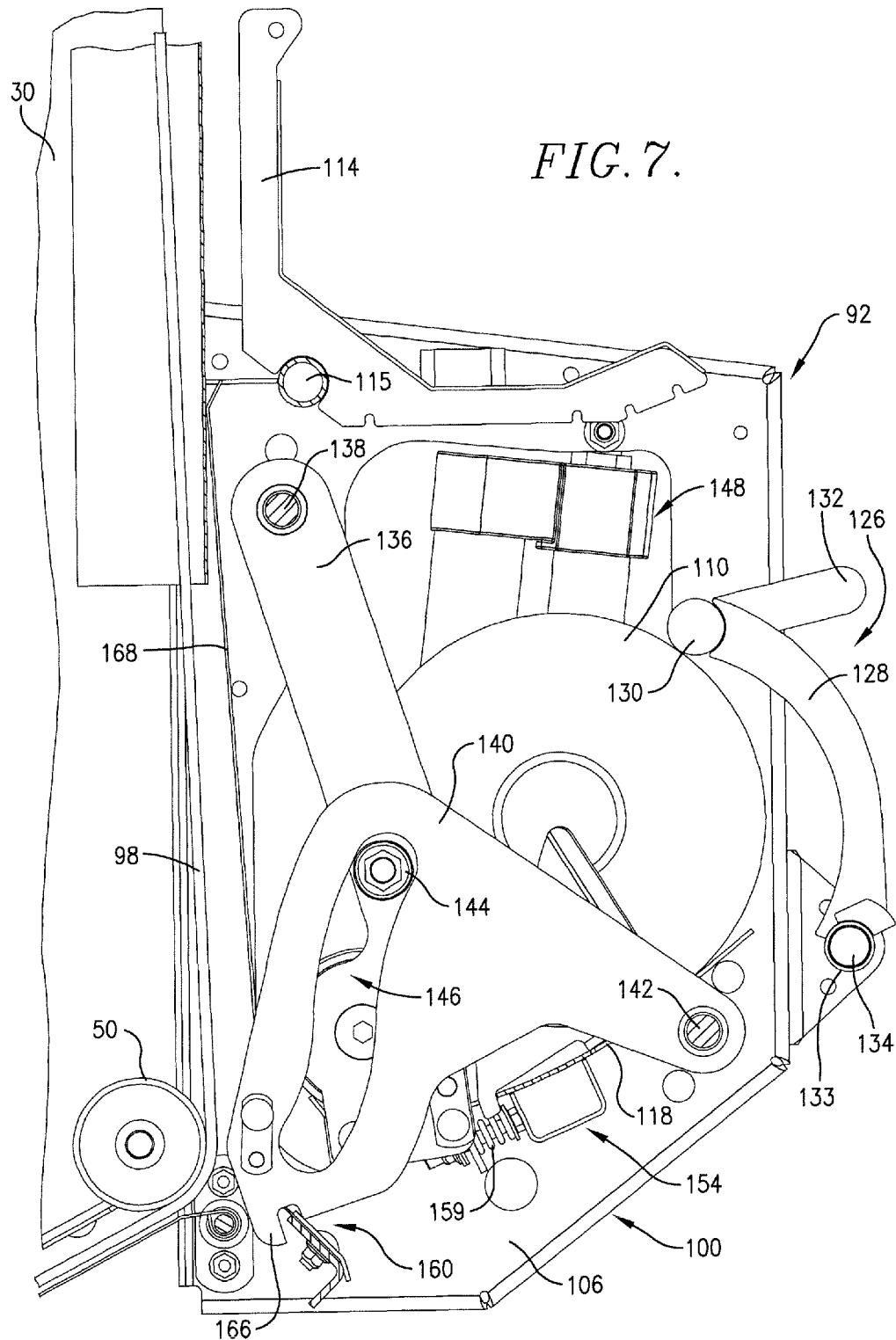
FIG. 7 is an enlarged, fragmentary, left side elevational view of the wrapper dispensing mechanism, similar in many respects to FIG. 6, but illustrating the other side of the mechanism, with the cover and left sidewall of the wrapping mechanism being removed to illustrate, among other things, the configuration of the mechanism with a supply roll supported thereon when in a first position.

Feed roller 116 is supported on a rockable swing frame 136 that is pivotally supported by sidewalls 104, 106 for fore-and-aft swinging movement about a transverse axis 138. Pivotable frame 136 allows feed roller 116 to shift between a first, belt-disengaged position, shown in FIGS. 7 and 8, and a second, belt-engaged position, shown in FIGS. 9 and 10. Pivotal frame 136 is operably interlinked with a movable arm 140, which itself pivots about a transverse axis 142. In the illustrated embodiment, the operable link between pivotal frame 136 and movable arm 140 comprises a pair of cam follower projections 144 that extend outwardly from opposite, left and right sides of frame 136 and are received within respective cam slots 146 defined within movable arms 140, such that movement of arms 140 causes frame 136 to shift between the first and second positions. Movable arms 140 are driven by positioning device 148 connected to one of the arms. In the illustrated embodiment, the positioning device is in the form of a piston mechanism 150 that is positioned by a controller (not shown), although other forms are within the ambit of the present invention.

Adjacent their forward ends, arms 140 are structurally tied together by a transverse member 166 so that arms 140 move as a unit when cylinder 150 is operated. A stiff, upstanding, plate-like curtain 168 extends upwardly from a pivotal connection 167 with arms 140 adjacent their forward ends and moves therewith to control (open and close) access between the interior of housing 100 and the interior of baling chamber 36. The upper end of curtain 168 bears against and slides along structure at the rear of the baler during such up and down movement.

Figure 9:
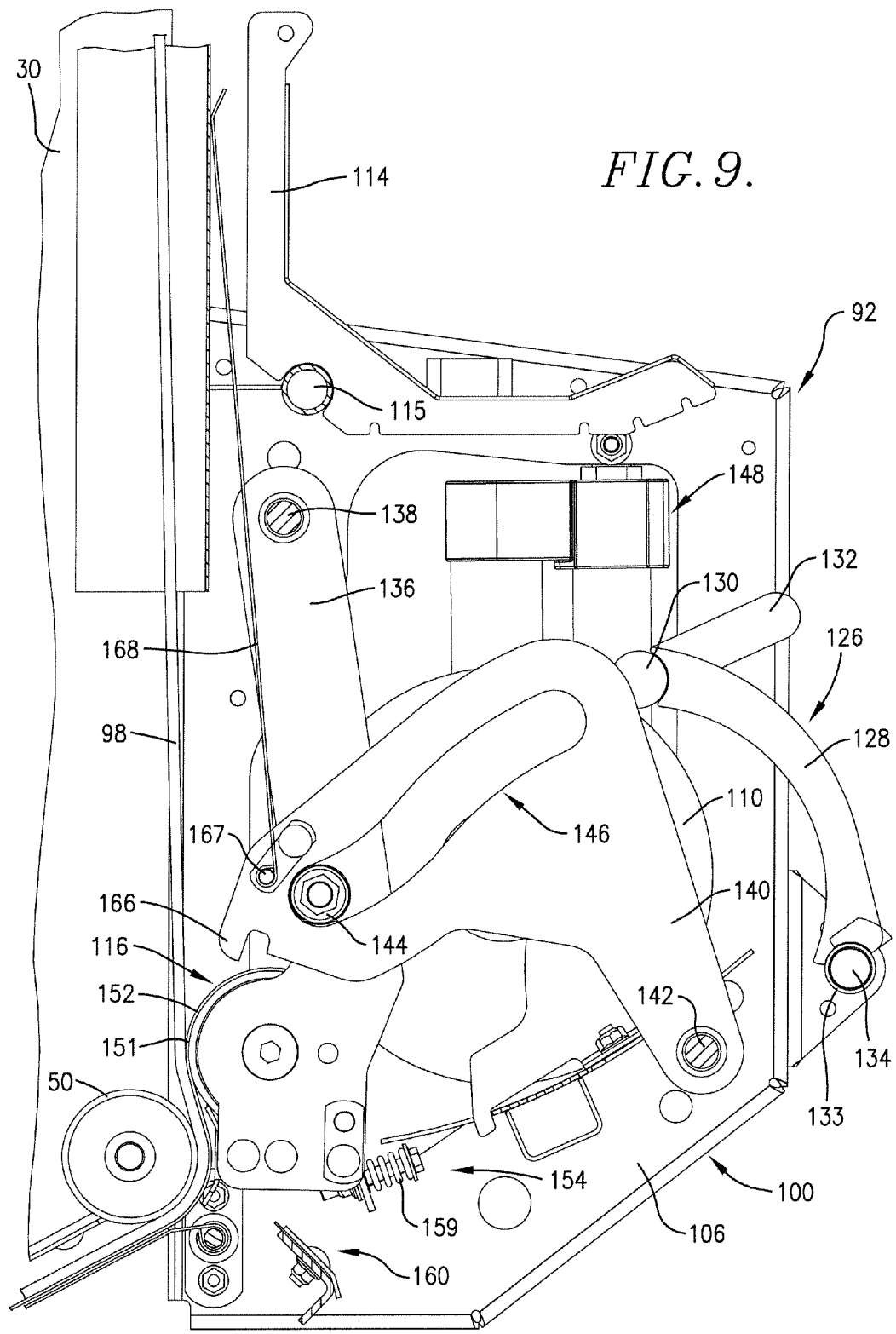
FIG. 9 is an enlarged, fragmentary, left side elevational view of the wrapper dispensing mechanism, similar in many respects to FIG. 7, but illustrating the configuration of the mechanism with a supply roll supported thereon when shifted into a second position engaged with a belt of the bale forming mechanism to define a temporary nip therebetween.
Figure 10:
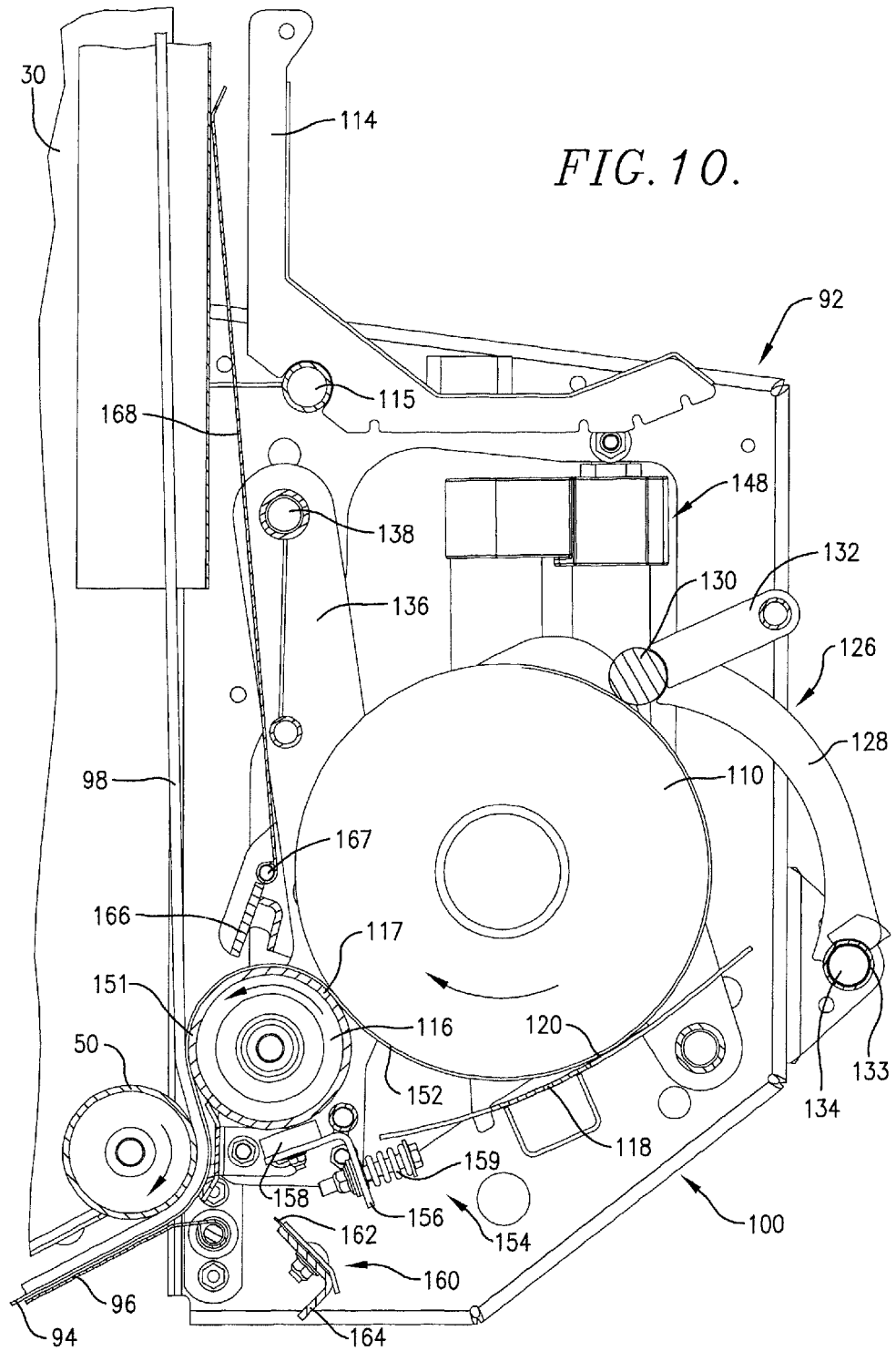
FIG. 10 is an enlarged, fragmentary, left side elevational view of the wrapper dispensing mechanism, similar in many respects to FIG. 9, but with additional components removed to illustrate, among other things, the configuration of the mechanism with a supply roll supported at least partially on the feed roller when the feed roller is shifted into a second position engaged with a belt of the bale forming mechanism to define a temporary nip therebetween.

With respect now to FIGS. 9 and 10, it can be seen that when feed roller 116 is in the second position, it is in engagement with rearward most belt stretch 98, creating a temporary nip 151 therebetween. A length of wrap material 152 extends from roll of supply material 110, around a peripheral portion of feed roller 116 (defined between the nip 117 and the temporary nip 151), and is pulled downstream by rearward most belt stretch 98 along pan 96 and into chamber inlet 80 where it wraps around fully formed bale 90, as will be readily appreciated by one of ordinary skill in the art upon review of this disclosure.

During paying out of wrapping material 94, roll of supply material 110 rotates in a clockwise direction as viewed in FIG. 10, while feed roller 116 rotates in a counterclockwise direction. In the illustrated embodiment, feed roller 116 is freewheeling, such that roller 116 is not rotationally driven unless it is in contact with rearward most belt stretch 98 when feed roller 116 is in the second position. In this way, rotation of feed roller 116 moves at the same speed as belt stretch 98, helping to eliminate back feeding problems.

Once length of wrap material 152 has been brought into contact with belt stretch 98, such that wrapping material 94 is being paid out into baling chamber 36, it is possible to move feed roller 116 from the second position to an intermediate position (not shown), whereby the downstream engagement between wrap material 94 and belts 66 continues to pull wrapping material 94 from supply roll 110 around feed roller 116. Such movement of feed roller 116 can be controlled by actuating positioning device 148 to rock frame 136 into the intermediate position. A braking assembly 154 can be brought against feed roller 116 in the intermediate position to at least slow, or completely stop, its rotation and increase tension of the wrapping, such as is discussed below.

In order to increase tension of wrapping material 94 being paid out by wrapper dispensing mechanism 102, braking assembly 154 can be incorporated to slow (or completely stop) rotation of feed roller 116. As shown in FIG. 10, braking assembly 154 comprises mounting structure 156 pivotally attached to the lower end of swing frame 136 and a friction block 158 fixed to structure 156. A compression spring 159 yieldably biases structure 156 in a clockwise direction (when viewing FIG. 10) to maintain block 158 in pressing contact with outer layer 124 of feed roller 116. It is specifically noted alternative braking assemblies, or no braking assembly at all, can be incorporated into wrapper dispensing mechanism 102 without departing from the teachings of the present invention.

At the conclusion of a wrapping cycle, a cutting assembly 160 functions to sever wrapping material 94 such that fully formed and wrapped bale 90 may be removed from baler 20 so that formation of a new bale may begin. In the illustrated embodiment, with particular attention to FIGS. 7 and 8, cutting assembly 160 includes a transverse knife 162 attached to mounting structure 164 that serves to fix knife 162 relative to sidewalls 104, 106 of housing 100. The transverse member 166 of movable arms 140 is configured to deflect a portion of wrapping material 94 against knife 162 to sever wrapping material 94 as arms 140 and frame 136 move into the first position. The position of knife 162 within housing 100 causes wrapping material 94 to be severed at a position downstream from temporary nip 151 created when arms 140 and frame 136 are in the second position, as shown in FIGS. 8 and 9.

The operation of wrapper dispensing mechanism 102 and a method of dispensing wrapping material 94 from supply roll 110 for wrapping formed bale 90 during a bale wrapping cycle in round baler 20 should be apparent from the foregoing description and, therefore, will be described here only briefly. Fully formed bale 90 is constructed by bale forming mechanism 34 within baling chamber 36 of round baler 20 in the usual manner, as will be readily appreciated by one of ordinary skill in the art. Baling chamber 36 includes baling element 66 that moves toward chamber inlet 80 and is used to pay out wrapping material 94 into baling chamber 36.

Supply roll 110 is supported at least partially on feed roller 116, with feed roller 116 being shiftable into and out of engagement with baling element 66 (second and first positions, respectively) to create temporary nip 151 therebetween. Engagement between feed roller 116 and moving belt stretch 98 drives feed roller 116 to rotate feed roller 116 and supply roll 110 to pay out wrapping material 94, which is then pulled into baling chamber 36 through inlet 80.

Rotation of feed roller 116 can be slowed (or completely stopped) to increase tension in wrapping material 94 downstream of feed roller 116 by associating braking assembly 154 with feed roller 116. At least at the conclusion of the wrapping cycle, feed roller 116 is shifted out of engagement with belt stretch 98 (first position) and wrapping material 94 is cut at a position downstream from temporary nip 151 by cutting assembly 160. In the illustrated embodiment cutting assembly 160 includes stationary transverse knife 162, against which a portion of wrapping material 94 is deflected by transverse member 166 of movable arms 140.

According to the embodiment illustrated in the drawing figures, in addition to supporting supply roll 110 on feed roller 116, supply roll 110 is cooperatively supported on concave surface 120 of platform 118 fixed within housing 100. The configuration of platform 118, including concave surface 120, is such that supply roll 110 is cooperatively supported and biased toward feed roller 116. It is again noted that feed roller 116 is freewheeling, and therefore is not rotationally driven unless feed roller 116 is disposed in engagement with belt stretch 98 (second position). In the illustrated embodiment, baling element 66 comprises a plurality of belts, although alternative baling elements (such as a single belt or a plurality of rollers) for use with wrapper dispensing mechanism 102 is clearly within the ambit of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. In a round baler having a bale forming mechanism and a wrapper dispensing mechanism for wrapping a formed bale with a length of wrapping material from a roll of supply material during a wrapping cycle, said bale forming mechanism defining a baling chamber and including a baling element that moves toward an access opening defined in the baling chamber, the improvement comprising:
    a feed roller,
    said feed roller being shiftable generally toward and away from said baling element so as to be selectively brought into and out of engagement with the baling element,
    said feed roller being driven by the baling element when the feed roller is in engagement with the baling element,
    said feed roller and said baling element cooperatively defining a temporary nip therebetween for paying out the wrapping material when the feed roller is in engagement with the baling element; and
    a positioning device operably coupled with the feed roller for shifting the feed roller between a first position during bale formation and a second position during bale wrapping,
    said first position including said feed roller being spaced away from the baling element,
    said second position including said feed roller being in engagement with the baling element and the wrapping material being trapped within the temporary nip, whereby the wrapping material is paid out by the feed roller and the baling element, and is pulled into the baling chamber through the opening by the baling element,
    said feed roller being disposed to at least partially vertically support the roll of supply material thereon.

2. In the round baler as claimed in claim 1,
    said feed roller consisting essentially of a single cylindrical member.

3. In the round baler as claimed in claim 2,
    said cylindrical member comprising an inner core and an outer layer,
    said outer layer being compressible for frictional engagement with the wrapping material.

4. In the round baler as claimed in claim 1,
    said feed roller being freewheeling so as not to be driven unless in engagement with the baling element.

5. In the round baler as claimed in claim 1,
    said bale forming mechanism comprising a set of belts arranged in such a manner as to define the baling chamber and the access opening to the baling chamber.

6. In the round baler as claimed in claim 5,
    said baling element comprising at least one of the belts,
    said at least one of the belts including a belt stretch that moves toward the access opening during the wrapping cycle.

7. In the round baler as claimed in claim 1; and
    a braking assembly operably associated with the feed roller and actuatable for engagement therewith to at least slow rotation of the feed roller, whereby tension in the wrapping material downstream of the feed roller is increased to provide a tighter wrap around the bale.

8. In the round baler as claimed in claim 7,
    said braking assembly comprising a friction block configured for engagement with an outer layer of the feed roller.

9. In the round baler as claimed in claim 1; and
    a frame supporting said feed roller,
    said frame being operably interconnected with the positioning device to shift the feed roller between the first position and the second position in response to input from the positioning device,
    said frame being pivotally mounted whereby movement of the feed roller between the first position and the second position is a rocking movement.

10. In the round baler as claimed in claim 1; and
    a cutting assembly for severing the wrapping material at the conclusion of the wrapping cycle,
    said cutting assembly being disposed to sever the wrapping material at a position downstream from said temporary nip with respect to the normal direction of travel of the wrapping material during the wrapping cycle.

11. In the round baler as claimed in claim 10; and
    a frame supporting said feed roller,
    said frame being operably interconnected with the positioning device to shift the feed roller between the first position and the second position in response to input from the positioning device,
    said frame being pivotally mounted whereby movement of the feed roller between the first position and the second position is a rocking movement,
    said cutting assembly including a transverse knife and a movable arm including a wrapping material contact portion,
    said wrapping material contact portion extending generally parallel to the knife,
    said movable arm being operably interconnected with said frame by a linkage in such manner as to cause the wrapping material contact portion to deflect the wrapping material against the knife and sever the material as the frame rocks the feed roller to the first position.

12. In the round baler as claimed in claim 11,
    said transverse knife being rigidly fixed to structure of the baler so as to be stationary with respect to the rocking frame and the movable arm during the severing of the wrapping material.

13. In the round baler as claimed in claim 1,
    said wrapping material comprising a web of material.

14. In the round baler as claimed in claim 13,
    said web of material comprising meshwrap.

15. In the round baler as claimed in claim 1; and
    a platform configured to at least partially vertically support the roll of supply material thereon,
    said platform and said feed roller cooperatively supporting the roll of supply material.

16. In the round baler as claimed in claim 15,
    said platform being generally arcuate to present an upwardly facing, concave, roll-engaging surface.

17. In the round baler as claimed in claim 15; and
    a hold down mechanism operable to bias the roll of supply material downward and toward the feed roller for engagement therewith.

* * * * *